Sept. 30, 1930.  L. ROEBEL  1,777,226
SLOT WINDING FOR ELECTRIC MACHINES
Filed Feb. 2, 1928
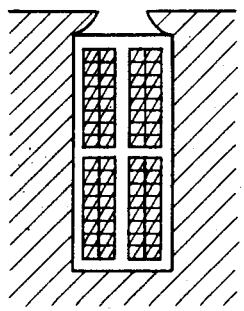
Fig.1
Fig.2      Fig.3      Fig.4      Fig.5
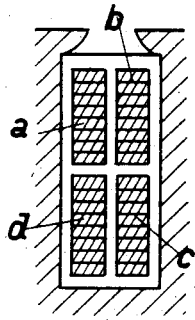 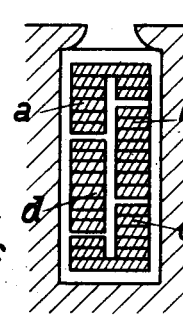 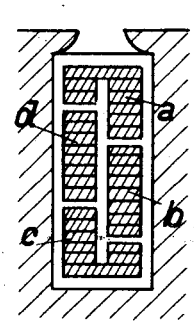 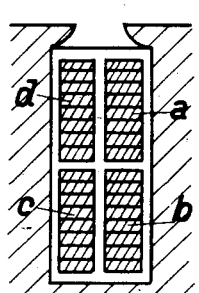
Fig.6      Fig.7      Fig.8
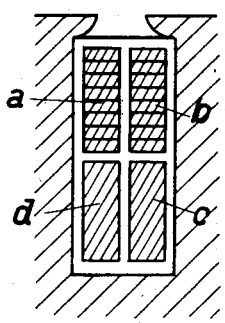 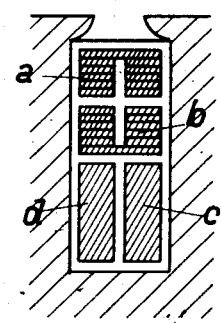 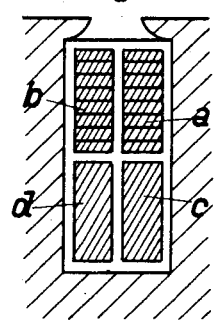
L. Roebel
INVENTOR
By: Marks & Clerk
Attys.

Patented Sept. 30, 1930

1,777,226

UNITED STATES PATENT OFFICE

LUDWIG ROEBEL, OF MANNHEIM, GERMANY, ASSIGNOR TO AKTIENGESELLSCHAFT BROWN, BOVERI & CIE., OF BADEN, SWITZERLAND

SLOT WINDING FOR ELECTRIC MACHINES

Application filed February 2, 1928, Serial No. 251,428, and in Germany December 31, 1926.

Various windings with conductors of large cross-section for electric machines are known, in which the total conductor cross-sectional area is subdivided into a number of part conductors which are more or less insulated from one another within the slot, but are connected together at the conductor ends, and which are so arranged, for instance by means of right angle bends, that on the way through the slot each of them is led through several places in the cross-section of the slot. Such conductors are described for instance in U. S. Patent specification 1,144,252. They have the object of preventing the formation of eddy currents in the conductors or at least of reducing them to an innocuous amount.

In practice, cases occur in which several conductors have to be housed in one slot, which are insulated from one another and which are for instance to be connected together and to the conductors in other slots in series.

If each of the separate conductors in a slot be made as a completely subdivided conductor, that is as a unit, the form of the total cross-section of which does not vary within the length of the slot and the position of which in the length of the slot also does not vary, we obtain for instance the cross-sectional arrangement shown in Fig. 1, in which it is assumed there are four conductors in one slot. Although in various known constructional forms of subdivided conductors the available cross-sectional area is relatively well utilized, an appreciable portion of the cross-section of the slot will, where there are several complete conductors of this kind in one slot, remain unused, i. e. not be filled with copper, owing to the fine subdivision and the insulation required between the separate part conductors.

According to the invention, in such cases the utilization of the cross-section of the slot is improved by each of the separate conductors of one slot not being made as a complete bar retaining its cross-sectional form and its position in the cross-section of the slot over the entire length of the slot, but by all the conductors to be housed in a single slot constituting a subdivided conductor in which separate groups of part conductors are combined and separately insulated. With such an arrangement each group of part conductors can be used as a separate conductor which may have a mean electric potential differing from that of the other conductors and be connected in series with the other conductors or may belong to another current phase or to another winding.

In an extreme case each separate part conductor might even constitute a separate conductor, so that each part conductor may have a different mean potential. In practice, however, this case will hardly occur.

The characteristic feature of the invention thus consists in this, that the conductors of one slot, which usually consist of several part conductors, no longer retain one unchanged position in the cross-section of the slot but in their passage through the slot pass through different places in the said cross-section, in some cases all places.

In Figs. 2, 3, 4 and 5 there are shown by way of example several cross-sections taken at successive points through a groove containing four such conductors. $a$, $b$, $c$ and $d$ are the four conductors housed in the groove, which are composed of part conductors. The arrangement of the four conductors is for instance that shown in U. S. Patent 1,144,252. The manner in which the change, shown in the figures, in the position in the cross-section of the slot, which each part conductor and consequently each conductor group experiences in passing along the slot, is brought about is explained in the said patent specification.

The invention is by no means limited to the arrangements shown in U. S. patent specification 1,144,252 but can be applied to all kinds of subdivided conductors.

The number of conductor groups in the groove is also not limited to four, and any other even or uneven number may be adopted.

Finally it is also not necessary that the structure shown in the drawing consisting of the conductor groups, which changes its cross-sectional form and position in the cross-section of the slot, shall fill the entire cross-section of the slot. As the formation of any currents takes place principally in the upper part of the slot, it is in some cases only necessary, where four conductors are placed in the slot, to construct the two outer conductors in accordance with the invention, while the two inner conductors are solid bars which retain their position in the cross-section of the slot. A constructional example of such an arrangement is shown in Figs. 6, 7 and 8 in various cross-sections through the slot.

What I claim is:

1. A slot winding for electric machines having a plurality of group conductors, composed of part conductors, which latter pass through different places in the cross-section of the slot on their way through the latter, wherein each group conductor itself passes through different, in some cases all, places in the cross section of the slot on its way through the slot, each group conductor being electrically independent of the other group conductors and capable of being controlled independently.

2. A slot winding as claimed in claim 1 wherein four conductors are arranged in each slot, the two outer conductors being group conductors, made of part conductors, while the inner conductors consist of solid bars which maintain their place unchanged in the cross section of the slot.

In testimony whereof I have signed my name to this specification.

LUDWIG ROEBEL.